United States Patent
Fogwill et al.

(10) Patent No.: US 11,378,556 B2
(45) Date of Patent: Jul. 5, 2022

(54) SYSTEM AND METHOD FOR CONTROLLING FLUID FLOW WITHIN A CHROMATOGRAPHY SYSTEM

(71) Applicant: Waters Technologies Corporation, Milford, MA (US)

(72) Inventors: Michael O. Fogwill, Uxbridge, MA (US); Thomas S. McDonald, Littleton, MA (US); Joshua A. Shreve, Acton, MA (US)

(73) Assignee: Waters Technologies Corporation, Milford, MA (US)

( * ) Notice: Subject to any disclaimer, the term of this patent is extended or adjusted under 35 U.S.C. 154(b) by 539 days.

(21) Appl. No.: 16/424,944

(22) Filed: May 29, 2019

(65) Prior Publication Data

US 2019/0369061 A1 Dec. 5, 2019

Related U.S. Application Data

(60) Provisional application No. 62/677,808, filed on May 30, 2018.

(51) Int. Cl.
*G01N 30/32* (2006.01)
*G01N 30/72* (2006.01)
*G01N 30/68* (2006.01)

(52) U.S. Cl.
CPC ............. *G01N 30/32* (2013.01); *G01N 30/68* (2013.01); *G01N 30/7206* (2013.01); *G01N 2030/324* (2013.01)

(58) Field of Classification Search
None
See application file for complete search history.

(56) References Cited

U.S. PATENT DOCUMENTS

2016/0375376 A1   12/2016   Wikfors

FOREIGN PATENT DOCUMENTS

WO   2013134223 A1   9/2013

OTHER PUBLICATIONS

Bajpai et al. "Integrating a post-column makeup pump into preparative supercritical fluid chromatography systems to address stability and recovery issues during purifications." J. Chromatogr. A. 1511(2017): 101-106.
Hirata et al. "Control of Flow Rate in Supercritical Fluid Chromatography." Chromatographia. 21.11(1986):627-630.

*Primary Examiner* — Daniel S Larkin
(74) *Attorney, Agent, or Firm* — Womble Bond Dickinson (US) LLP; Deborah M. Vernon

(57) ABSTRACT

The present disclosure relates to methodologies, systems, apparatus, and kits for controlling fluid flow within a chromatography system. A makeup pump is configured to pump a makeup fluid into the chromatography system downstream of the column. A first restrictor is located upstream of a detector and downstream of both the makeup pump and the column. Decreasing an output volume of the makeup pump can direct an output from the column through the first restrictor to the detector. Increasing an output volume of the makeup pump can direct the output from the column to a second restrictor located downstream of the makeup pump and the column and in parallel with the first restrictor and the detector.

20 Claims, 11 Drawing Sheets

SYSTEM AND METHOD FOR CONTROLLING FLUID FLOW WITHIN A CHROMATOGRAPHY SYSTEM

CROSS-REFERENCE TO RELATED APPLICATION

This application claims benefit of and priority to U.S. Provisional Patent Application No. 62/677,808 filed May 30, 2018, the entire contents of which is hereby incorporated herein in its entirety.

FIELD OF THE TECHNOLOGY

The present disclosure generally relates to pressurized fluid systems used in chromatography. In particular, the present disclosure relates to systems and methods for diverting mobile phase flow within a chromatography system.

BACKGROUND

Chromatography involves the flowing of a mobile phase over a stationary phase to effect separation. To speed-up and enhance the efficiency of the separation, pressurized mobile phases are introduced. Carbon dioxide based chromatographic systems use $CO_2$ as a component of the mobile phase flow stream, and the $CO_2$ based mobile phase is delivered from pumps and carried through the separation column as a pressurized liquid. The $CO_2$ based mobile phase is used to carry components of the analytes in a sample through the chromatography column to the detection system.

Chromatography systems often use a restrictor to interface to the detection system. The restrictor can be used to maintain system pressure and to regulate or introduce a portion of the mobile phase flow to the detection system.

SUMMARY

Diverting mobile phase flow within a chromatography system raises a number of challenges, especially when dealing with a highly compressible mobile phase, such as a $CO_2$-based mobile phase. Technology for smoothly redirecting mobile phase flow with limited pressure changes would be beneficial and highly desirable.

According to one aspect, the present disclosure relates to a method for controlling fluid flow within a chromatography system. The method includes activating a makeup pump configured to pump a makeup fluid into the chromatography system downstream of a column. The method also includes determining a flow rate through a first restrictor, wherein the first restrictor is located upstream of a detector and downstream of both the makeup pump and the column. The method also includes decreasing an output volume of the makeup pump in order to direct a portion of an output from the column through the first restrictor and to the detector. The method also includes increasing an output volume of the makeup pump in order to direct the output from the column to a second restrictor located downstream of the makeup pump and the column and in parallel with the first restrictor and the detector. In a non-limiting example, the chromatography system is a $CO_2$-based chromatography system including a $CO_2$-based mobile phase. In another non-limiting example, the first restrictor is a fixed restrictor and the second restrictor is a back pressure regulator. In another non-limiting example, a maximum flow value of the fixed restrictor determines a maximum amount of fluid directed to the detector. In another non-limiting example, the detector is a mass spectrometer or a flame ionization detector. In another non-limiting example, the makeup pump is configured to pump a makeup fluid having a same composition as a mobile phase solvent exiting the column. In another non-limiting example, increasing an output volume of the makeup pump also flushes the first restrictor of the output from the column. In another non-limiting example, controlling the output volume of the makeup pump selectively directs the output from the column to the detector at predetermined portions of a chromatographic run. In another non-limiting example, determining the flow rate through the first restrictor includes measuring the flow rate using a flow sensor. In another non-limiting example, adjusting the output volume of the makeup pump controls a ratio of the output from the column directed to the first restrictor and the second restrictor.

According to another aspect, the present disclosure relates to a system for controlling fluid flow within a chromatography system. The system includes a makeup pump configured to pump a makeup fluid into a chromatography system downstream of a column. The system also includes a first restrictor located downstream of the makeup pump and upstream of a detector. The system also includes a second restrictor located downstream of the makeup pump and the column and in parallel with the first restrictor and the detector. The system also includes a computing device configured to determine a flow rate through the first restrictor and control an operation of the makeup pump in order to: decrease an output volume of the makeup pump in order to direct a portion of an output from the column through the first restrictor and to the detector; and increase an output volume of the makeup pump in order to direct the output from the column to the second restrictor. In a non-limiting example, the chromatography system is a $CO_2$-based chromatography system including a $CO_2$-based mobile phase. In another non-limiting example, the first restrictor is a fixed restrictor and the second restrictor is a back pressure regulator. In another non-limiting example, a maximum flow value of the fixed restrictor determines a maximum amount of fluid directed to the detector. In another non-limiting example, the detector is a mass spectrometer or a flame ionization detector. In another non-limiting example, the makeup pump is configured to pump a makeup fluid having a same composition as a mobile phase solvent exiting the column. In another non-limiting example, increasing an output volume of the makeup pump also flushes the first restrictor of the output from the column. In another non-limiting example, the computing device is further configured to control the output volume of the makeup pump in order to selectively direct the output from the column to the detector at predetermined portions of a chromatographic run. In another non-limiting example, the computing device is further configured to determine the flow rate through the restrictor using a flow sensor.

According to another aspect, the present disclosure relates to a method for controlling fluid flow within a chromatography system. The method includes activating a makeup pump configured to pump a makeup fluid including $CO_2$ into a $CO_2$-based chromatography system downstream of a column. The method also includes measuring a flow rate through a first restrictor, wherein the first restrictor is located upstream of a detector and downstream of both the makeup pump and the column. The method also includes increasing an output volume of the makeup pump in order to direct an output from the column to a second restrictor located downstream of the makeup pump and the column and in parallel with the first restrictor and the detector. The method also includes decreasing an output volume of the makeup pump during a predetermined segment of a chromatographic run in order to direct a portion of the output from the column through the first restrictor and to the detector. The method also includes increasing the output volume of the makeup pump after the predetermined segment of the chromatographic run in order to redirect the output from the column away from the detector and to the second restrictor.

The above aspects of the technology provide numerous advantages. For example, systems and methods of the present technology allows for flow splitting without the need for valves by simply adjusting the output of a makeup pump. In particular, conventional systems do not have the ability to control mobile phase flow without valves. As a result, pressure changes caused by valve switching can damage restrictors, columns, or other elements within the chromatography system. Further, valves are wear items requiring regular service, and the valves introduce dispersion to the system resulting in reduced chromatographic performance.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

One of ordinary skill in the understand that the drawings primarily are for illustrative purposes and are not intended to limit the scope of the inventive subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The features and advantages of the present disclosure will become more apparent from the detailed description set forth below when taken in conjunction with the drawings.

DETAILED DESCRIPTION

Following below are more detailed descriptions of various concepts related to, and embodiments of, methodologies, apparatus and systems for controlling fluid flow within a chromatography system. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

As used herein, the term "includes" means includes but is not limited to, the term "including" means including but not limited to. The term "based on" means based at least in part on.

A "restrictor" herein refers to a component used in a chromatography system that is used to regulate or decrease flow. In some embodiments a restrictor is also used to interface to a detection component. Non-limiting examples of restrictors include a length of straight, small internal diameter tubing, a tapered restrictor, a converging-diverging restrictor, an integral restrictor, or a fritted restrictor. Non-limiting examples of active restrictors include a variable restrictor, a thermally modulated variable restrictor, or a back pressure regulator.

When coupling chromatography to mass spectrometry, flow diversion is often employed. Flow diversion only introduces the portion of the chromatographic mobile phase which contains analytes of interest. During other portions of the chromatographic elution, the mobile phase is diverted away from the detector in order to keep the detector as clean as possible longer. In some cases, a simple valve can be employed to direct the flow to and away from the detector.

Figure 1A:
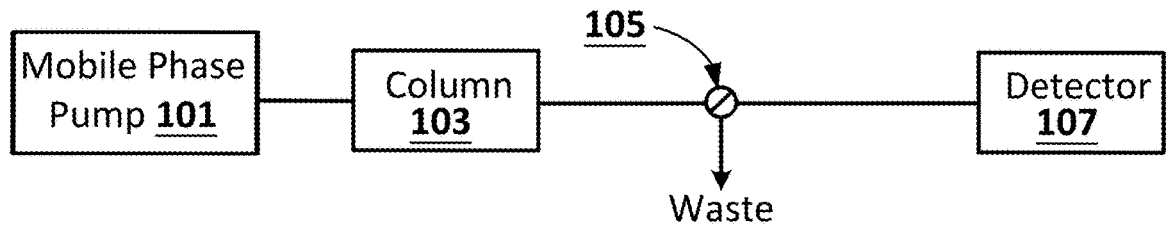
FIG. 1A is an example block diagram of a prior art chromatography system that utilizes a valve to direct fluid flow.

FIG. 1A illustrates an example block diagram of a prior art chromatography system that utilizes a valve 105 to direct the output of the column 103 either to waste or to a detector 107. The system may include a mobile phase pump 101 connected to the column 103. During a chromatographic run, the output of the column 103 is often of least interest at the beginning and end of the run. In some cases, the valve 105 can direct the output of the column to waste during those time periods of least interest. The valve can include, for example, a simple rotary shear valve.

Chromatography systems are widely used for separating a sample including analytes into its constituents. Due to their low cost and ease of manufacture, restrictors are implemented in many types of chromatography systems. The restrictor can be used to maintain system pressure in the chromatography system and to introduce a portion of the mobile phase flow to a detector. For example, a restrictor can be used to control the interface to a low-pressure detection component, such as but not limited to a mass spectrometry (MS) detection system, an evaporative light scattering detection system, or a flame ionization (FID) detection system.

Figure 1B:
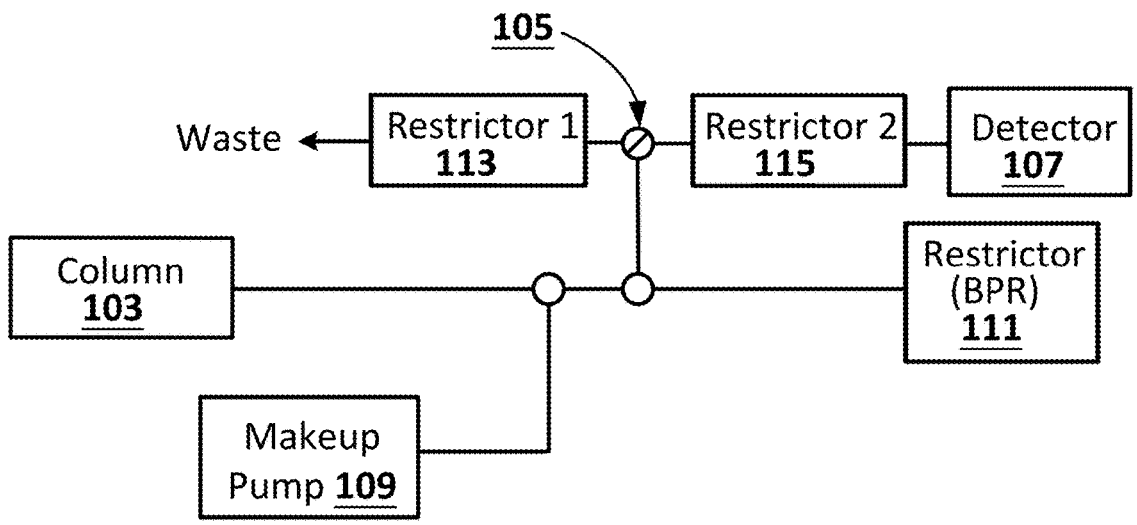
FIG. 1B is an example block diagram of a chromatography system implemented with one or more restrictors, according to an embodiment of the present disclosure.
Figure 1C:
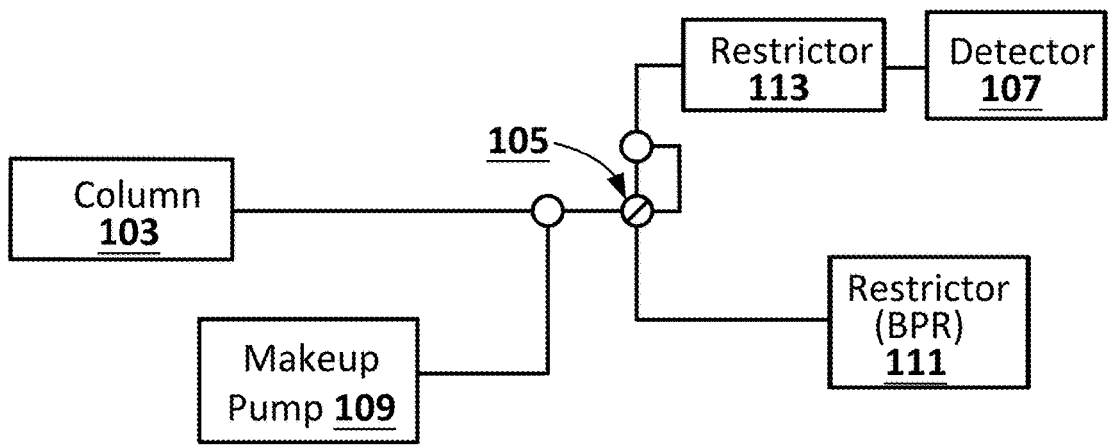
FIG. 1C is another example block diagram of a chromatography system implemented with one or more restrictors, according to an embodiment of the present disclosure.

FIGS. 1B and 1C show example block diagrams of chromatography systems where one or more restrictors are utilized along with a valve. The use of a valve 105, such as a rotary shear valve, can result in pressure changes across the valve and when the valve is changing fluid flow direction within the chromatography system. In order to mitigate these pressure changes, a makeup pump 109 is positioned downstream of the chromatography column 103, and one or more restrictors can be positioned downstream of the makeup pump 109. The makeup pump 109 can be configured to pump a solvent, such as $CO_2$ or a combination of $CO_2$ and a liquid modifier. In the example shown in FIG. 1B, a portion of the combined output of the column 103 and the makeup pump 109 is directed to a restrictor, such as a back pressure regulator (BPR) 111. Another portion of the combined output of the column 103 and the makeup pump 109 is directed to a valve 105 that can direct fluid to waste via a first restrictor 113, or direct fluid to a detector 107 via a second restrictor 115. The first restrictor 113 and second restrictor 115 can be designed to have similar flow rates (i.e. pressure drops) so that the pressure perturbation when actuating the valve is much lower in FIG. 1B vs. FIG. 1C. In some embodiments, the detector 107 can include a MS detection system, an evaporative light scattering detection system, or a FID detection system. In the example shown in FIG. 1C, the combined output of the column 103 and the makeup pump 109 is directed to a valve 105 that can direct fluid to a BPR 111 or to a detector 107 through a restrictor 113.

The valve-based configuration described in FIGS. 1A-1C may not be acceptable for use with compressible mobile phases, such as those encountered in $CO_2$-based chromatography systems, because such systems experience dramatic pressure fluctuations when the valve cycles and because, in certain valve positions, the restrictor is not flushed by a mobile phase often resulting in restrictor clogging.

Figure 2A:
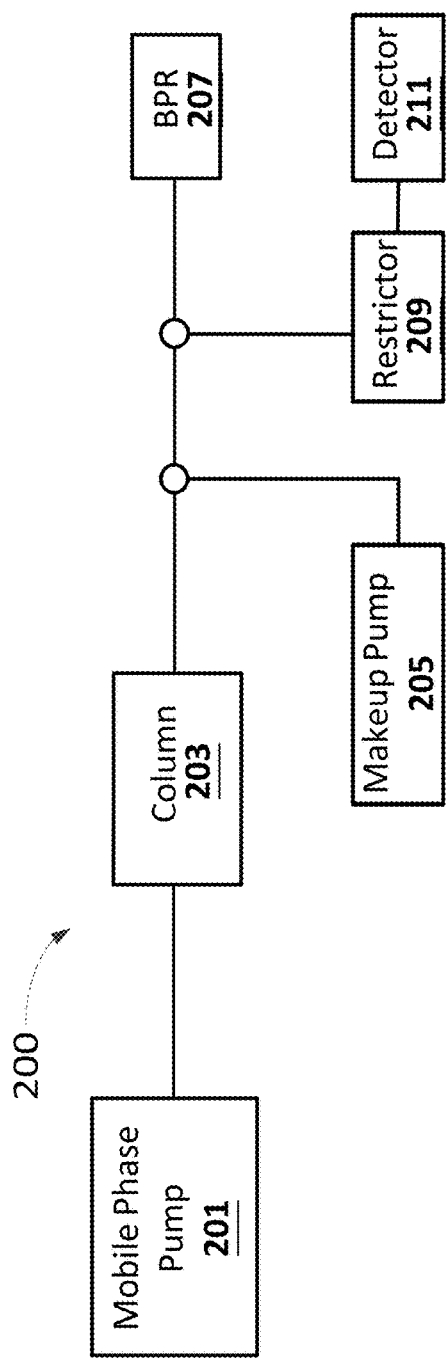
FIG. 2A is an example block diagram of an analytical chromatography system including a makeup pump and a fixed restrictor, according to an embodiment of the present disclosure.
Figure 2B:
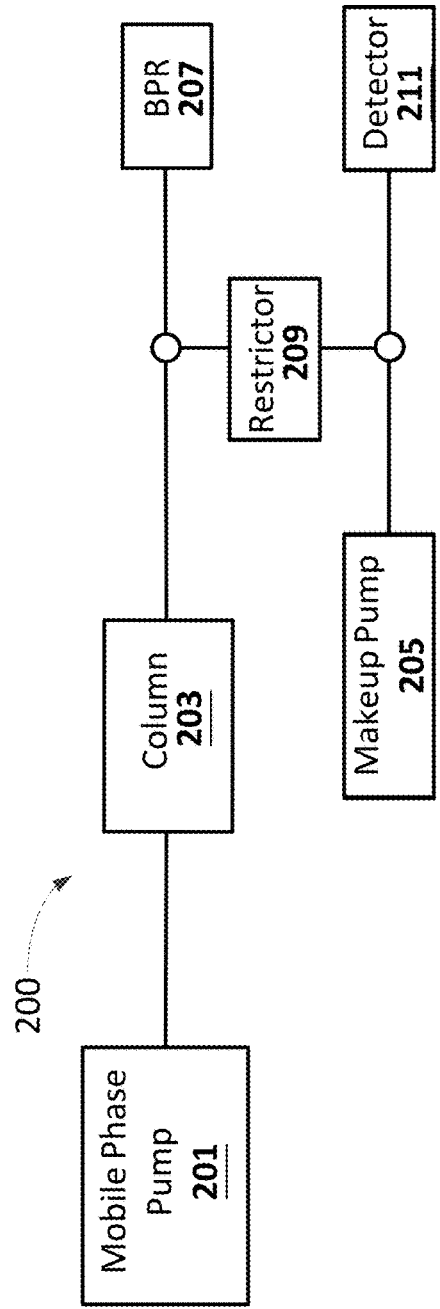
FIG. 2B is an example block diagram of a preparatory chromatography system including a makeup pump and a fixed restrictor, according to an embodiment of the present disclosure.

FIGS. 2A and 2B show example block diagrams of chromatography systems 200 including a makeup pump 205 and a fixed restrictor 209, wherein the fixed restrictor 209 is located downstream of the chromatography column 203 and upstream of a detector 211. The chromatography system 200 may include a mobile phase pump 201 configured to direct a mobile phase to the chromatography column. Controlling a split ratio in such a chromatography system is important for precise, accurate, repeatable, and robust operation. One such application of splitting the chromatographic mobile phase flow is interfacing to detection, such as mass spectrometry or flame ionization detection. In one example embodiment, a portion of the mobile phase flow is directed to a destructive detector 211, such as a mass spectrometer or a flame ionization detector. The bulk of the mobile phase flow can be directed to a fraction collector or to a BPR 207. Accurate and precise control of the split ratio is important to maintain detector response within a narrow window of optimal operation and/or to maintain uniform detector response over a changing mobile phase property, such as composition, flow rate, or pressure.

FIG. 2A illustrates an example analytical fluid chromatography system where a makeup fluid is added downstream of the column 203 using a makeup pump 205. In this embodiment, a portion of the combined makeup fluid and column output is directed to a BPR 207, while another portion is directed to the detector 211 via the restrictor 209. In the case of a splitter as shown in FIG. 2A, the makeup fluid has a minimal effect on the split ratio. The split ratio is primarily affected by the pressure of the BPR 207 and, to a lesser extent, on the composition of the combined mobile phase and makeup fluid flow.

FIG. 2B illustrates an example chromatography system where the makeup pump 205 is configured to provide a makeup fluid downstream of the restrictor 209 between the detector 211 and the restrictor 209. In each case, the makeup fluid has little effect on the split ratio. However, since there is post-decompression transport in the configuration shown in FIG. 2B, the splitter can suffer from poor robustness by allowing analytes or matrix components to precipitate out into the restrictor after depressurization.

Figure 3:
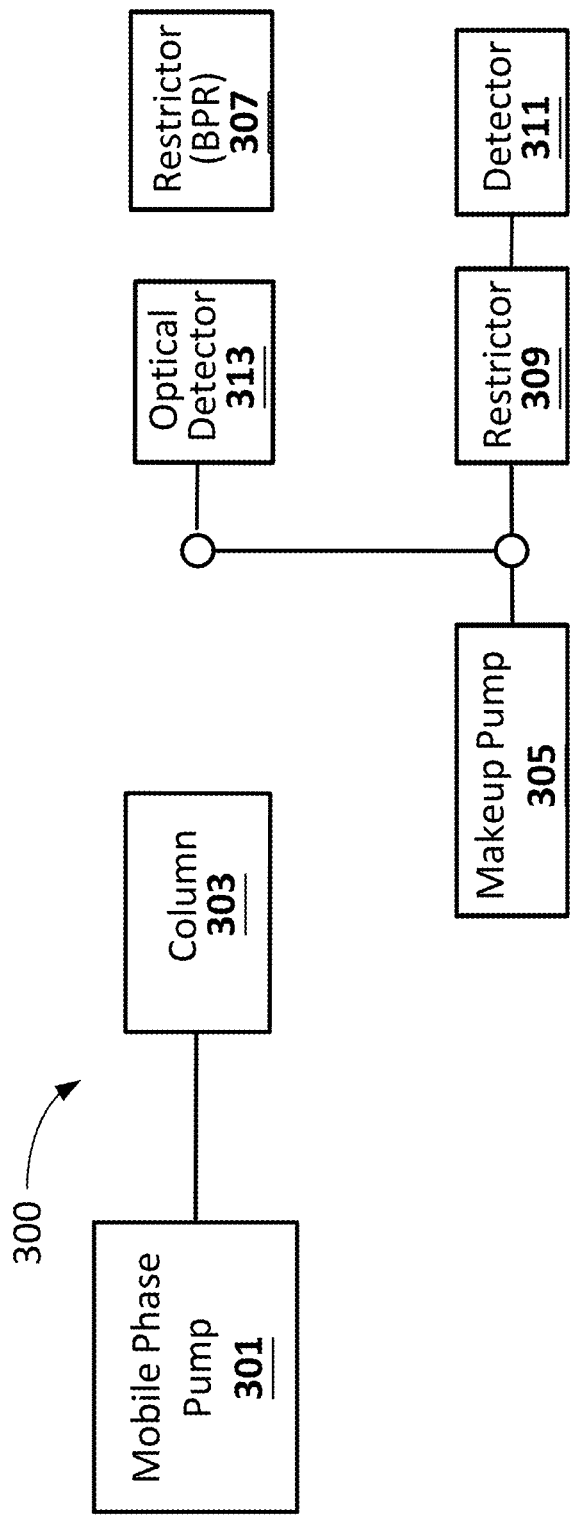
FIG. 3 is another example block diagram of a chromatography system including a makeup pump and a fixed restrictor, according to an embodiment of the present disclosure.

FIG. 3 shows an example block diagram of a chromatography system 300 including a makeup pump 305 and a restrictor 309, according to another embodiment of the present disclosure. The system acts as a splitter and includes a mobile phase pump 301 connected to the chromatography column 303. Although this design may be applicable to liquid chromatography mobile phases, it is particularly useful with a $CO_2$ based chromatography system with a highly compressible $CO_2$ mobile phase. In this particular example, the makeup pump 305 adds a makeup fluid upstream of the restrictor 309. Since the restrictor 309 only allows a certain fluid flow rate, the makeup fluid flow rate has a strong effect on the split ratio. The output of the column 303 is combined with a portion of the output of the makeup pump 305 upstream of an optical detector 313 and a BPR 307.

Figure 4:
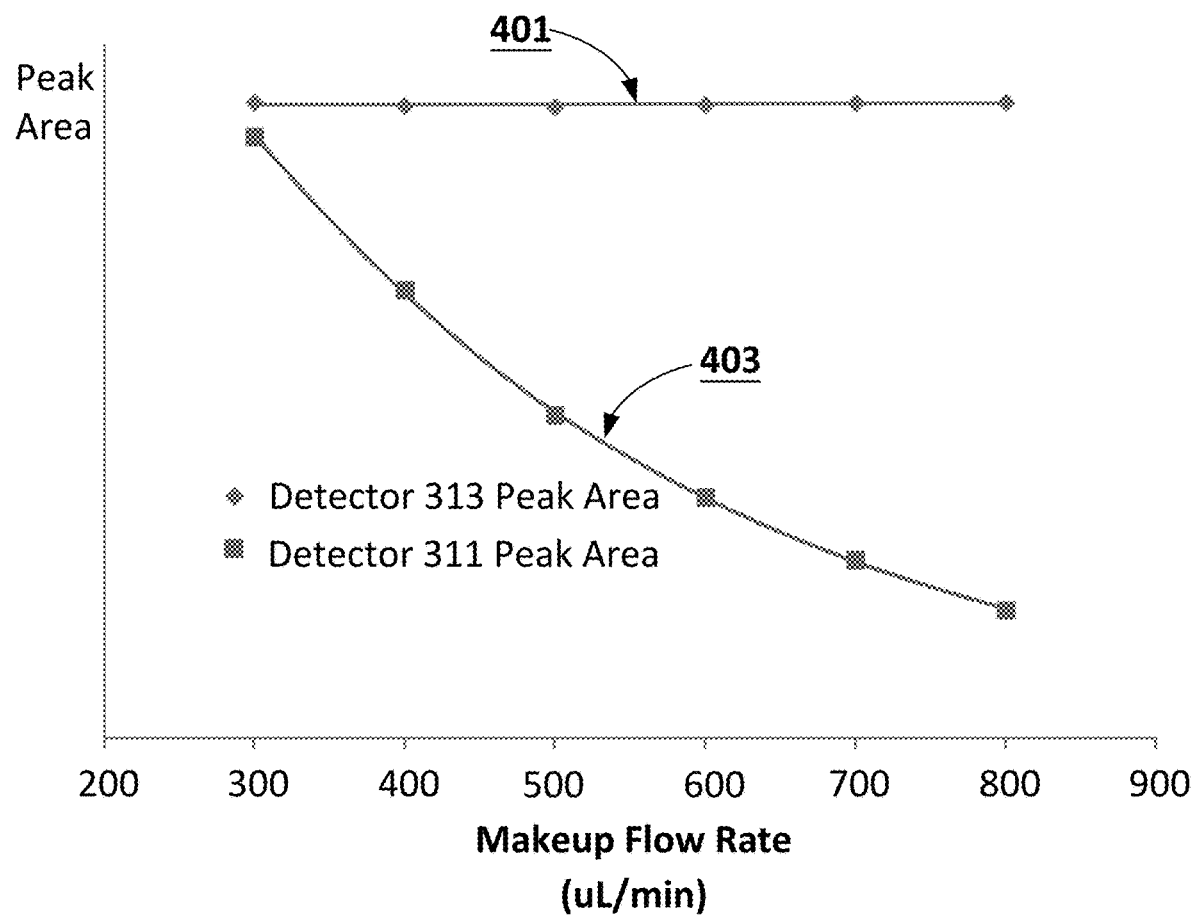
FIG. 4 is a graph showing the peak area measured at two locations along the chromatography system of FIG. 3.

FIG. 4 is a graph showing the peak area (y-axis) at the optical detector 313 (plot 401) and the detector 311 (plot 403) of FIG. 3 as the flow rate from the makeup pump 305 increases. As can be seen in this graph, the peak area of the peak passing through the detector 311 is shown in plot 403, which decreases as the makeup fluid flow rate increases from the makeup pump 305. Because the restrictor 309 is located between the makeup pump 305 and the detector 311, as the flow rate from the makeup pump 305 increases, the flow of makeup fluid backs up and begins flowing toward the optical detector 313, thus preventing any of the output from the column 303 from making it to the detector 311. This backflow of makeup fluid ahead of the restrictor 309 results in the decreasing peak area at the detector 311, which is shown in plot 403.

Figure 5:
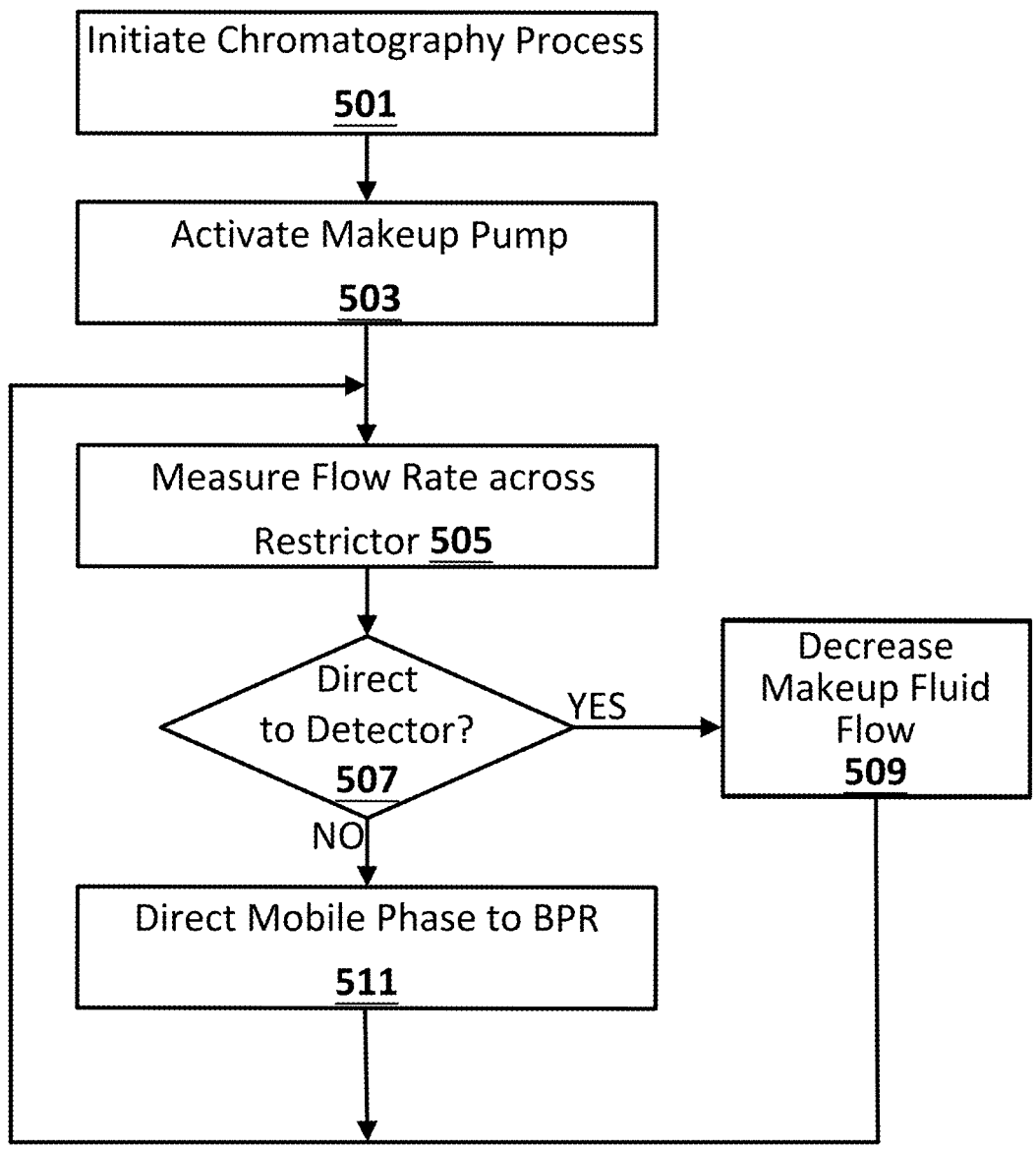
FIG. 5 is a flowchart illustrating an exemplary method for controlling fluid flow within a chromatography system, according to an embodiment of the present disclosure.

FIG. 5 is a flowchart illustrating an exemplary method for controlling fluid flow within a chromatography system, according to an exemplary embodiment. It will be appreciated that the method can be programmatically performed, at least in part, by one or more computer-executable processes executing on, or in communication with, one or more servers or other computing devices such as those described further below. In step 501, the chromatography process is initiated by activating a mobile phase pump in order to flow a mobile phase through a chromatography column. In some example embodiments, the chromatography system is a $CO_2$-based chromatography system, and the mobile phase is a $CO_2$-based mobile phase.

In step 503, a makeup pump is activated to introduce a makeup fluid downstream of the column. The makeup fluid can be the same composition as the mobile phase solvent exiting the column. In some non-limiting examples, the makeup fluid can include $CO_2$ or a combination of $CO_2$ and a liquid modifier.

In step 505, pressure is measured across a restrictor that is located downstream of the makeup pump and upstream of a detector. The restrictor can be located as shown and described above in reference to FIG. 3 as restrictor element 309. This restrictor limits the fluid flow to the detector, as described above. In alternative embodiments, the pressure drop can be defined by the setpoint on one end of a BPR with ambient pressure at the other end. In such an embodiment, the pressure would be defined rather than measured, and the system can measure or estimate the flow rate through the restrictor in order to determine the makeup flow rate required to change the flow direction through the restrictor.

In step 507, it is determined whether to direct the mobile phase from the column to the detector. As discussed above, the output of the chromatography column is of most interest during particular portions of a chromatographic run. Typically, the beginning and end of a run are of least interest and may be directed away from the detector. If it is determined in step 507 that the mobile phase should be directed to the detector, the method continues with decreasing the makeup fluid flow in step 509. Decreasing the makeup fluid flow allows the output of the column to flow through the restrictor and to the detector, as discussed above in reference to FIG. 3. If it is determined in step 507 that the mobile phase should not be directed to the detector, the method directs the mobile phase to the BPR in step 511. In one example embodiment, the mobile phase can be directed to the BPR by increasing the makeup fluid flow and creating a backflow upstream of the restrictor, as discussed above in reference to FIG. 4, thus directing the output of the column to the BPR and preventing the column output from going to the detector. After the makeup fluid flow has been increased and the mobile phase is directed to the BPR in step 511, or after the makeup fluid flow has been decreased in step 509, the method returns to measuring the pressure across the restrictor in step 505.

Figure 6:
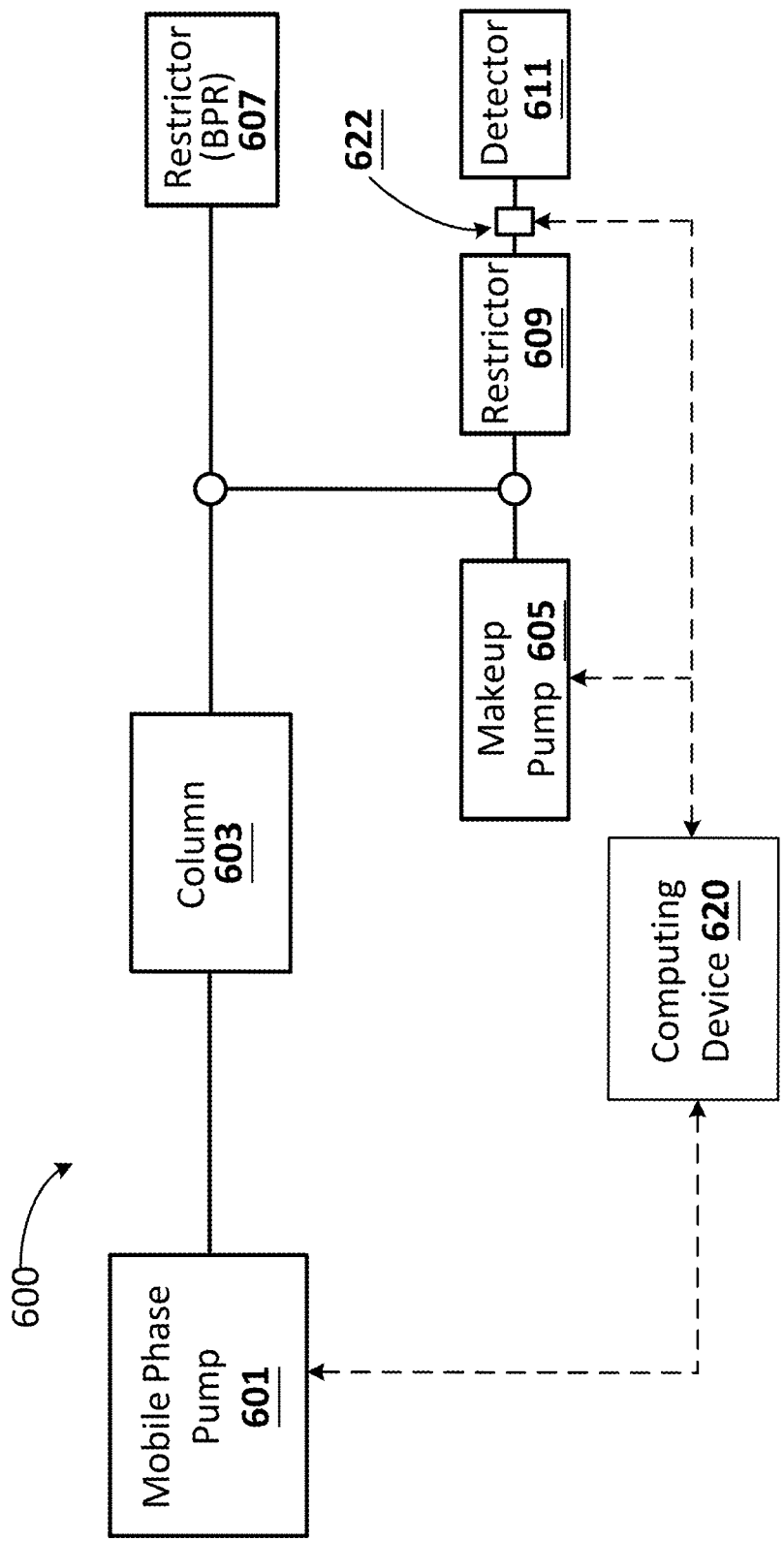
FIG. 6 is another example block diagram of a chromatography system including a makeup pump and a fixed restrictor, according to an embodiment of the present disclosure.

FIG. 6 shows an example block diagram of a chromatography system 600 including a makeup pump 605 and a restrictor 609, according to another embodiment of the present disclosure. The system 600 is suitable for the implementation of the method described above in FIG. 5 and acts as a splitter to selectively direct the output of a chromatography column 603 to a detector 611 or a BPR 607. The system 600 includes a mobile phase pump 601 connected to the chromatography column 603, and both the makeup pump 605 and the mobile phase pump 601 can be controlled using a computing device 620, in some embodiments. Although this design may be applicable to liquid chromatography mobile phases, it is particularly useful with a $CO_2$ based chromatography system with a highly compressible $CO_2$ mobile phase. In this particular example, the makeup pump 605 adds a makeup fluid upstream of the restrictor 609. Since the restrictor 609 only allows a certain fluid flow rate, the makeup fluid flow rate has a strong effect on the split ratio. In some embodiments, the computing device 620 can measure the pressure across the restrictor 609 in order to determine a particular makeup pump flow rate suitable for directing the output of the column 603 to either the detector 611 or the BPR 607. The computing device 620 can also measure the flow of makeup fluid through the restrictor 609 in order to determine the point above which the flow to the detector 611 will be diverted. In a non-limiting example, this flow can be determined empirically by infusing an analyte and increasing the makeup flow until the signal at the detector 611 disappears. Conversely, one or more flow sensors 622 can be located at the restrictor to measure a flow rate with the makeup off in order to determine the approximate divert flow rate. In another embodiment, the restrictor 609 can be calibrated ahead of time to determine the divert flow rate. Factors relevant to determining divert flow rate can include, for example, restrictor dimensions, the BPR set point (i.e., pressure across the restrictor), and the composition of the makeup fluid.

In some embodiments, the BPR 607 can be replaced with some other type of pressure-controlling component. For example, in some embodiments, not shown, the pressure-controlling component consists of a pressure controlling fluid pump.

Figure 7A:
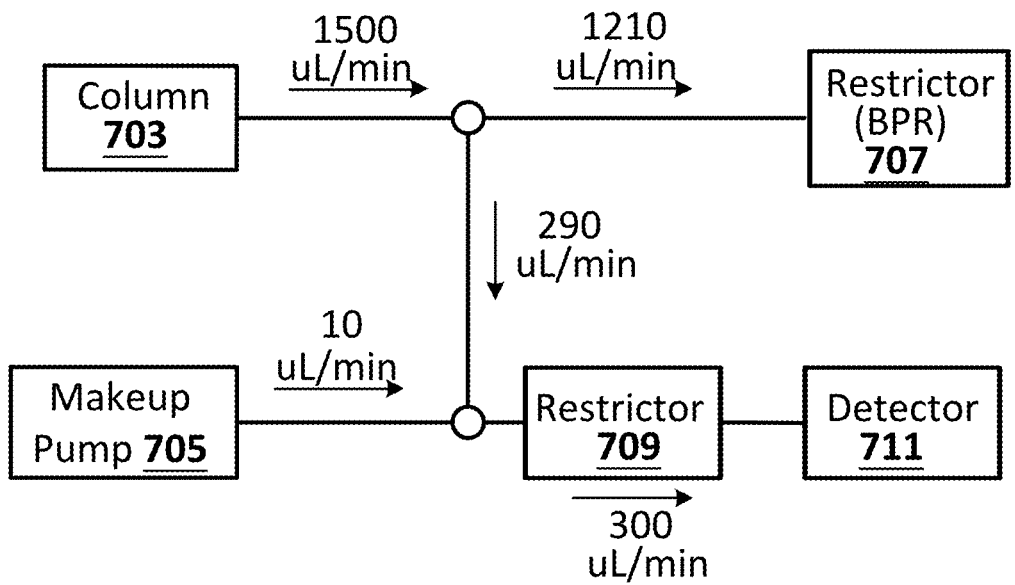
FIGS. 7A-7B show an example block diagram of an active splitter implemented with a makeup pump and a restrictor, according to an embodiment of the present disclosure.
Figure 7B:
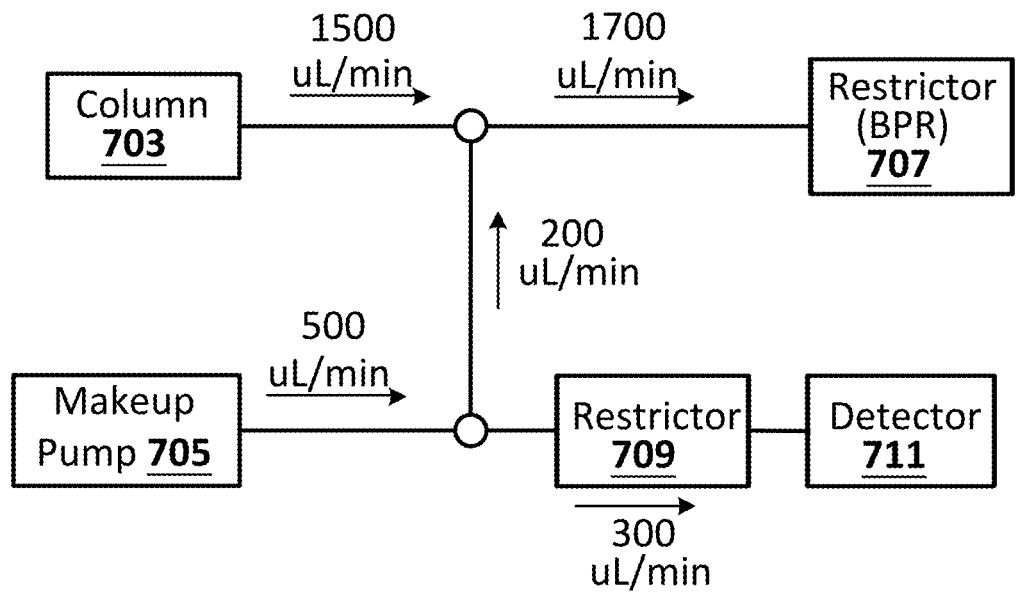

FIGS. 7A and 7B show block diagrams of an active splitter implemented with a makeup pump 705 and a restrictor 709, according to an embodiment of the present disclosure. FIG. 7A shows a non-limiting example of the active splitter with a low makeup fluid flow rate of 10 uL/min from the makeup pump 705. The output of the column 703 has a flow rate of 1,500 uL/min, and a flow rate of 290 uL/min is allowed to flow to from the column 703 and in the direction of the restrictor 709. In this particular embodiment, the restrictor 709 limits the flow rate to the detector 711 to 300 uL/min. The remainder of the output from the column 703 results in a flow rate of 1,210 uL/min directed to a BPR 707 (or another type of suitable restrictor). FIG. 7B shows a non-limiting example of the active splitter where the flow rate from the makeup pump 705 is increased to 500 uL/min. Because this flow rate exceeds the limit of the restrictor 709, the split flow is directed toward the BPR 707 at a flow rate of 200 uL/min. This split flow is then combined with the 1,500 uL/min flow from the column 703 and results in 1,700 uL/min being directed to the BPR 707. In the example shown in FIG. 7B, the fluid flowing through the restrictor 709 is entirely made up of the makeup fluid from the makeup pump 705, and none of the analytes from the column 703 reach the detector 711. In this manner, flow diversion is achieved with no moving parts or valves. In a non-limiting example, the system shown in FIGS. 7A-7B can be programmed to normalize the split ratio when mobile phase flow rate, mobile phase composition, or BPR pressure is changed. For example, the split ratios can be changed from approximately 5:1 (as shown in FIG. 7A) to approximately 7.5:1 by adjusting the makeup flow from 10 uL/min to 100 uL/min, if other conditions within the system were maintained. Such an adjustment would result in a reduction of 90 uL/min (from 290 uL/min to 200 uL/min) of the output of the column being directed to the restrictor 709. Thus, adjusting the makeup flow rate can be used to control the split ratio of the system.

This flow diversion technique offers additional benefits to $CO_2$-based chromatography systems. First, the restrictor is never depressurized, and, when diverting, the restrictor is flushed with makeup fluid. In this manner restrictor robustness can be significantly improved. Secondly, since flow is never stopped or valved, there is minimal system pressure perturbation when the diversion system is actuated. In addition to robustness improvements, eliminating divert valves from the system may improve chromatographic performance by reducing system volume (peak dispersion).

Figure 8A:
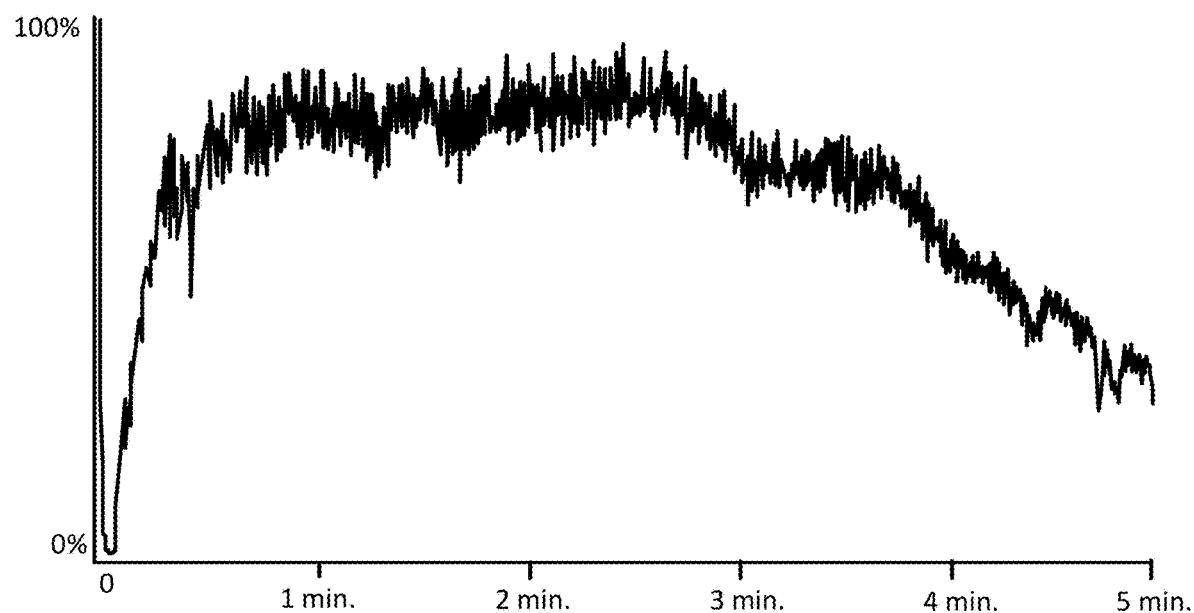
FIG. 8A is a graph showing an infusion trace with no flow diversion in a splitter designed according to FIGS. 7A-7B.
Figure 8B:
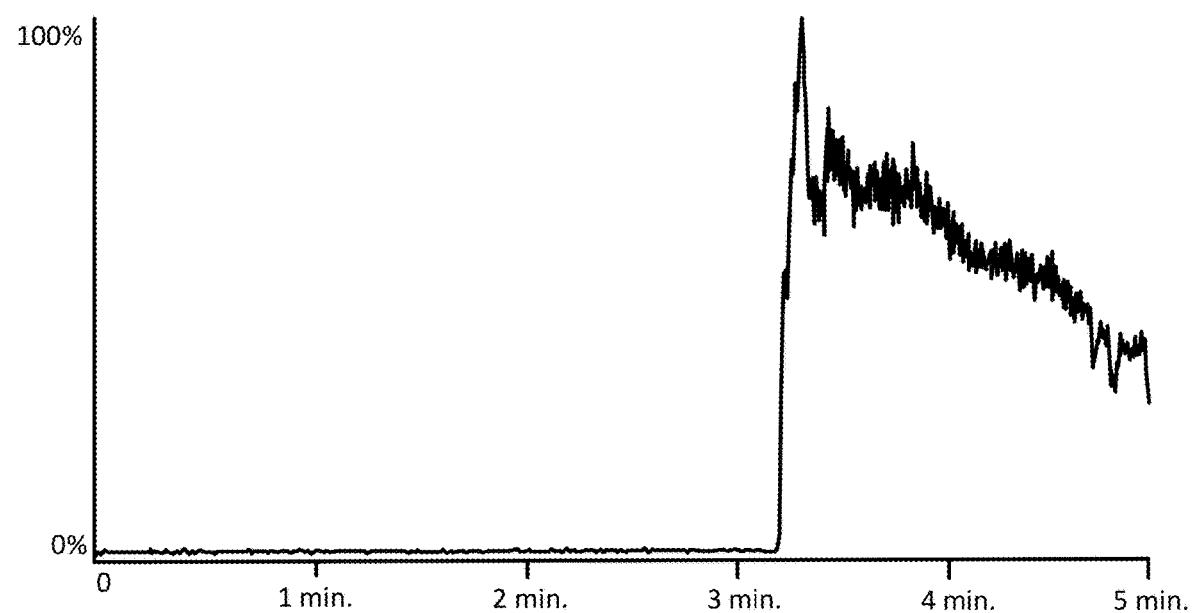
FIG. 8B is a graph showing an infusion trace with flow diversion in a splitter designed according to FIGS. 7A-7B.

FIG. 8A is a graph showing an infusion trace with no flow diversion in a splitter designed as described above in reference to FIGS. 7A and 7B. FIG. 8B is a graph showing a similar infusion trace with flow diversion for the first 3.25 minutes of a chromatogram, after which the mobile phase is re-introduced to the detector.

Figure 9:
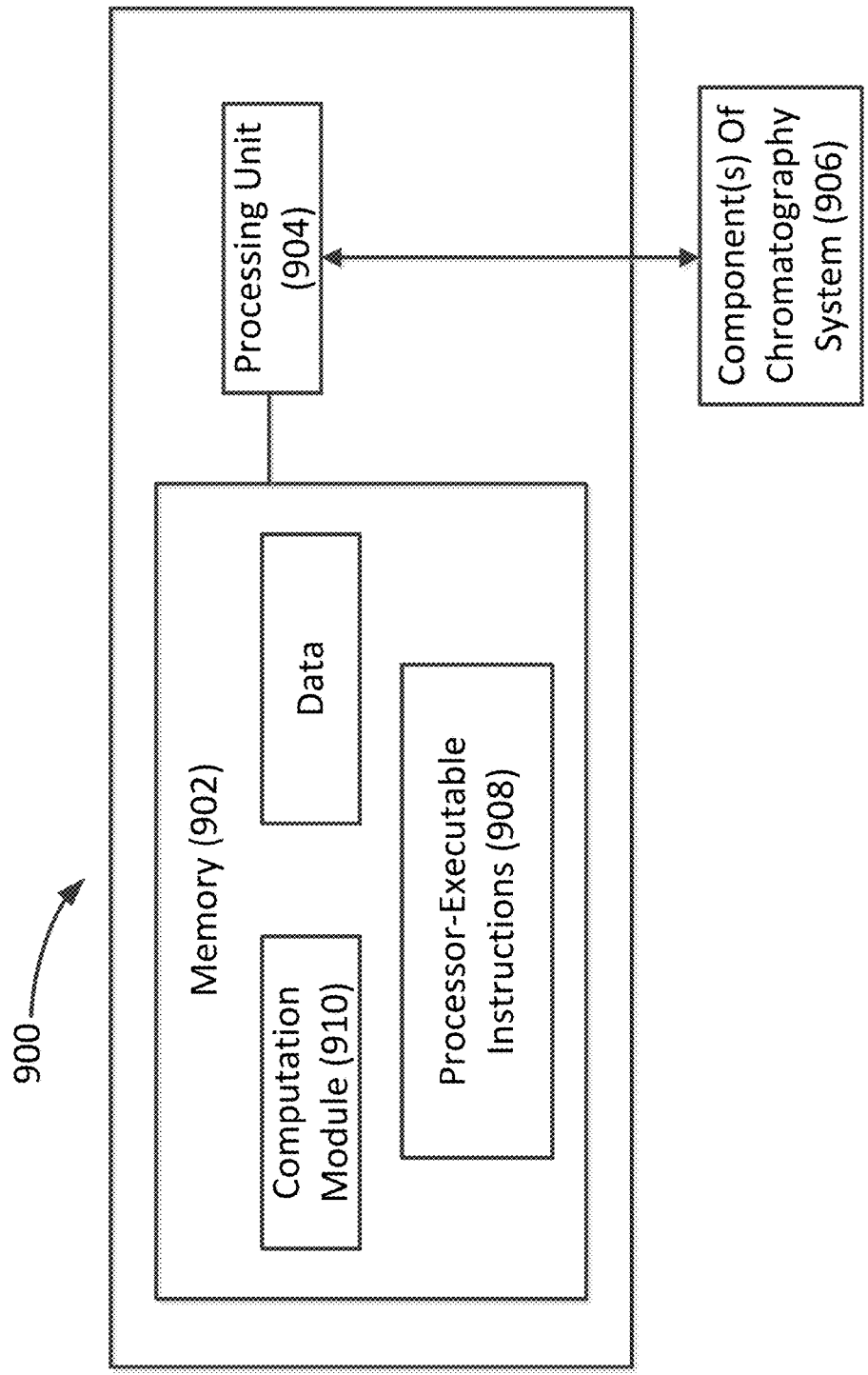
FIG. 9 shows an example apparatus that can be used to perform example processes and computations, according to principles of the present disclosure.

FIG. 9 shows a non-limiting example apparatus 900 that can be used to implement an example method for controlling fluid flow within a chromatography system, according to the principles described herein. The apparatus 900 includes at least one memory 902 and at least one processing unit 904. The at least one processing unit 904 is communicatively coupled to the at least one memory 902 and also to at least one component of a chromatography system 906.

The at least one memory 902 is configured to store processor-executable instructions 908 and a computation module 910. In an example method, as described in connection with FIG. 5, the at least one processing unit 904 can execute processor-executable instructions 908 stored in the memory 902 to cause the computation module 910 to compute a desired makeup fluid flow rate and generate processor executable instructions 908 configured to increase or decrease the flow rate of the makeup pump. The computation module 910 can also be used to compare pressure values measured across a restrictor and flow rates from a mobile phase pump. Such values can be compared using, for example, a lookup table or database in order to determine a desired flow rate for the makeup pump.

Figure 10:
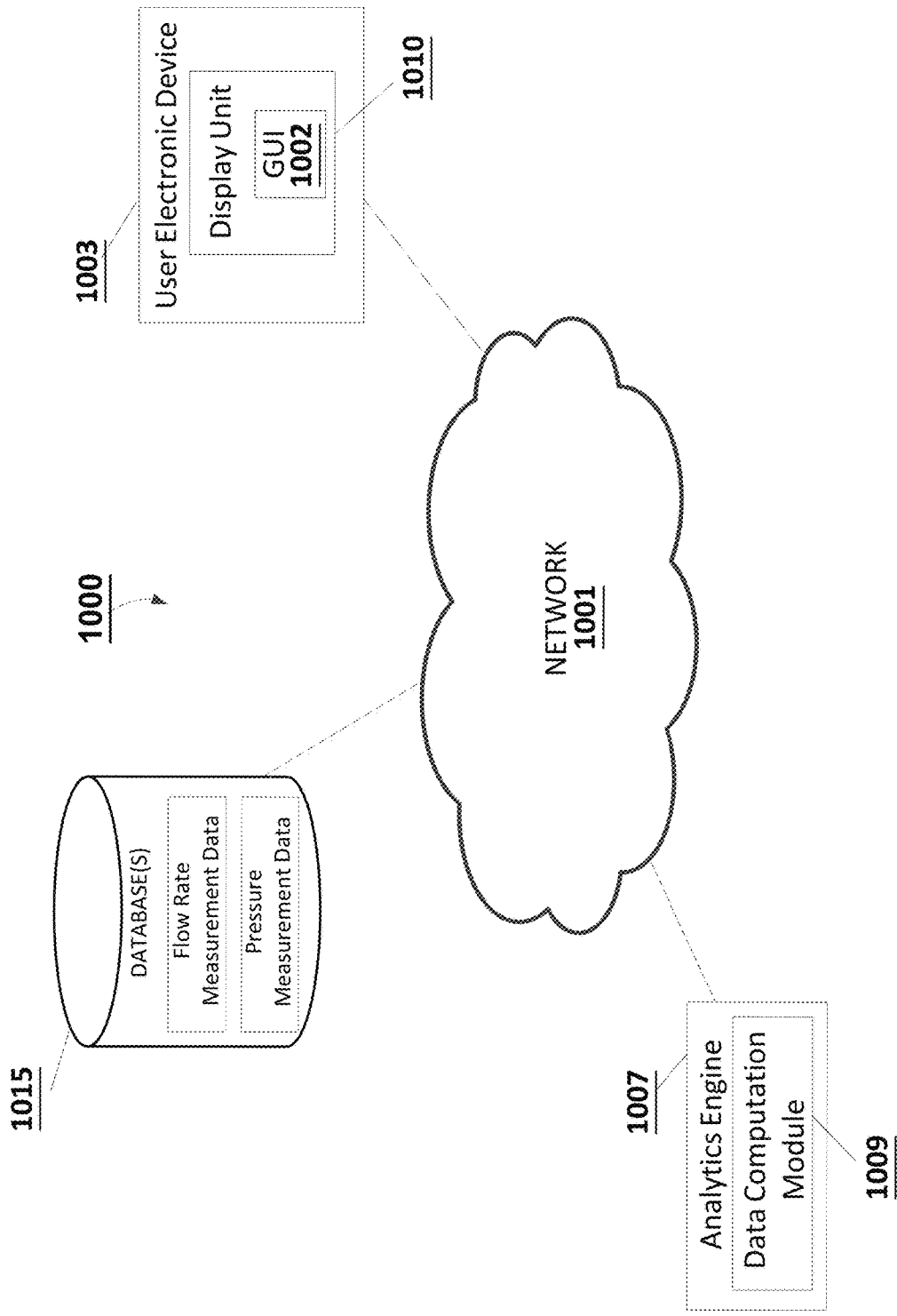
FIG. 10 is a diagram of an example network environment suitable for a distributed implementation, according to principles of the present disclosure.

FIG. 10 illustrates a network diagram depicting a system 1000 suitable for a distributed implementation of example systems described herein. The system 1000 can include a network 1001, a user electronic device 1003, an analytics engine 1007, and a database 1015. As will be appreciated, the analytics engine 1007 can be local or remote servers, and various distributed or centralized configurations may be implemented, and in some embodiments a single server can be used. In exemplary embodiments, the analytics engine 1007 can include one or more modules 1009, which can implement one or more of the processes described herein, or portions thereof, with reference to FIG. 5. For example, the analytics engine 1007 can include a data computation module 1009 configured to perform one or more of the processes and computations described in connection with FIG. 5. The user electronic device 1003 and analytics engine 1007 can communicate with each other and with the database 1015 and at least one component of the chromatography system to control a flow of mobile phase within a chromatography system and divert mobile phase to or away from a detector.

In exemplary embodiments, the user electronic device 1003 may include a display unit 1010, which can display a GUI 1002 to a user of the device 1003 such that the user can view the rendered graphic icon, visual display, or type of other signal used to indicate a current mobile phase flow path, as described above. The user electronic device 1003 may include, but is not limited to, smart phones, tablets, ultrabooks, netbooks, laptops, computers, general purpose computers, Internet appliances, hand-held devices, wireless devices, portable devices, wearable computers, cellular or mobile phones, portable digital assistants (PDAs), desktops, multi-processor systems, microprocessor-based or programmable consumer electronics, game consoles, set-top boxes, network PCs, mini-computers, and the like. The user electronic device 1003 may include some or all components described in relation to computing device 1100 shown in FIG. 11. The user electronic device 1003 may connect to network 1001 via a wired or wireless connection. The user electronic device 1003 may include one or more applications such as, but not limited to, a web browser, a sales transaction application, an object reader application, and the like.

In exemplary embodiments, the user electronic device 1003, analytics engine 1007, and database 1015 may be in communication with each other via a communication network 1001. The communication network 1001 may include, but is not limited to, the Internet, an intranet, a LAN (Local Area Network), a WAN (Wide Area Network), a MAN (Metropolitan Area Network), a wireless network, an optical network, and the like. In one embodiment, the user electronic device 1003, and analytics engine 1007 can transmit instructions to each other over the communication network 1001. In exemplary embodiments, the flow rate measurement data, pressure measurement data, and other data can be stored at database 1015 and received at the analytics engine 1007.

Figure 11:
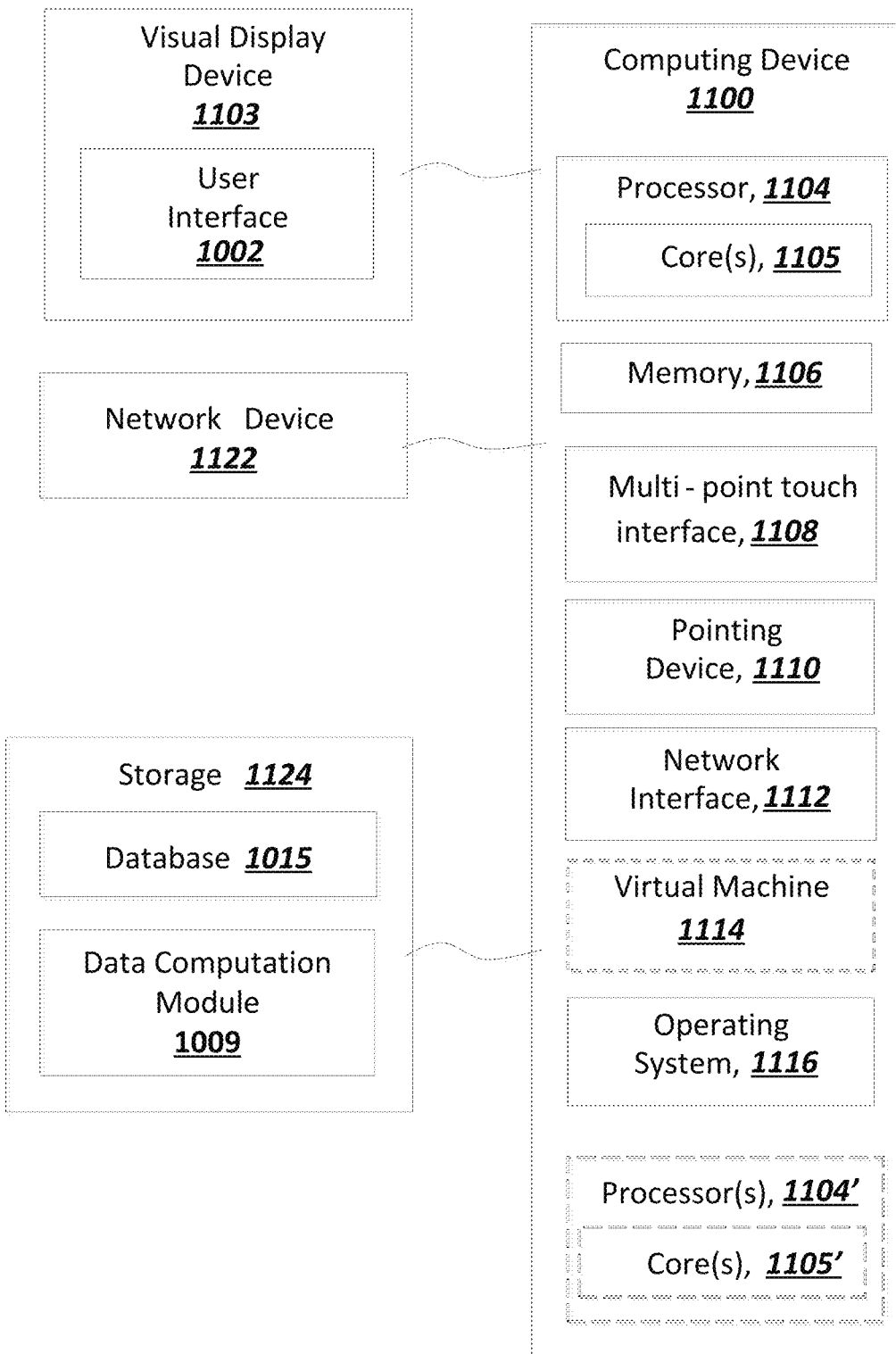
FIG. 11 is a block diagram of an example computing device that can be used to perform example processes and computations, according to principles of the present disclosure.

FIG. 11 is a block diagram of an exemplary computing device 1100 that can be used in the performance of any of the example methodologies according to the principles described herein (including example methodologies associated with FIG. 5). The computing device 1100 includes one or more non-transitory computer-readable media for storing one or more computer-executable instructions (such as but not limited to software or firmware) for implementing any example method according to the principles described herein (including example methodologies associated with FIG. 5). The non-transitory computer-readable media can include, but are not limited to, one or more types of hardware memory, non-transitory tangible media (for example, one or more magnetic storage disks, one or more optical disks, one or more USB flashdrives), and the like.

For example, memory 1106 included in the computing device 1100 can store computer-readable and computer-executable instructions or software for implementing exemplary embodiments and programmed to perform processes described above in reference to FIG. 5 (including processor-executable instructions 908). The computing device 1100 also includes processing unit 1104 (and associated core 1105), and optionally, one or more additional processor(s) 1104' and associated core(s) 1105' (for example, in the case of computer systems having multiple processors/cores), for executing computer-readable and computer-executable instructions or software stored in the memory 1106 and other programs for controlling system hardware. Processing unit 1104 and processor(s) 1104' can each be a single core processor or multiple core (1105 and 1105') processor.

Virtualization can be employed in the computing device 1100 so that infrastructure and resources in the computing device can be shared dynamically. A virtual machine 1114 can be provided to handle a process running on multiple processors so that the process appears to be using only one computing resource rather than multiple computing resources. Multiple virtual machines can also be used with one processor.

Memory 1106 can be non-transitory computer-readable media including a computer system memory or random access memory, such as DRAM, SRAM, EDO RAM, and the like. Memory 1106 can include other types of memory as well, or combinations thereof.

A user can interact with the computing device 1100 through a visual display device 1103, such as a touch screen display or computer monitor, which can display one or more user interfaces 1002 that can be provided in accordance with exemplary embodiments. The computing device 1100 can also include other I/O devices for receiving input from a user, for example, a keyboard or any suitable multi-point touch interface 1108, a pointing device 1110 (e.g., a pen, stylus, mouse, or trackpad). The keyboard 1108 and the pointing device 1110 can be coupled to the visual display device 1103. The computing device 1100 can include other suitable conventional I/O peripherals.

The computing device 1100 can also include one or more storage devices 1124, such as a hard-drive, CD-ROM, or other non-transitory computer readable media, for storing data and computer-readable instructions and/or software, such as a data computation module 1009 that can implement exemplary embodiments of the methodologies and systems as taught herein, or portions thereof. The databases can be updated by a user or automatically at any suitable time to add, delete, or update one or more items in the databases. Exemplary storage device 1124 can store one or more databases 1015 for storing flow rate measurement data, pressure measurement data, and any other data/information used to implement exemplary embodiments of the systems and methodologies described herein.

The computing device 1100 can include a network interface 1112 configured to interface via one or more network devices 1122 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1112 can include a built-in network adapter, network interface card, PCMCIA network card, card bus network adapter, wireless network adapter, USB network adapter, modem or any other device suitable for interfacing the computing device 1100 to any type of network capable of communication and performing the operations described herein. Moreover, the computing device 1100 can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 1100 can run any operating system 1116, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 1116 can be run in native mode or emulated mode. In an exemplary embodiment, the operating system 1116 can be run on one or more cloud machine instances.

In describing example embodiments, specific terminology is used for the sake of clarity. For purposes of description, each specific term is intended to at least include all technical and functional equivalents that operate in a similar manner to accomplish a similar purpose. Additionally, in some instances where a particular example embodiment includes a plurality of system elements, device components or method steps, those elements, components or steps can be replaced with a single element, component or step. Likewise, a single element, component or step can be replaced with a plurality of elements, components or steps that serve the same purpose. Moreover, while example embodiments have been shown and described with references to particular embodiments thereof, those of ordinary skill in the art will understand that various substitutions and alterations in form and detail can be made therein without departing from the scope of the disclosure. Further still, other aspects, functions and advantages are also within the scope of the disclosure.

Example flowcharts are provided herein for illustrative purposes and are non-limiting examples of methodologies. One of ordinary skill in the art will recognize that example methodologies can include more or fewer steps than those illustrated in the example flowcharts, and that the steps in the example flowcharts can be performed in a different order than the order shown in the illustrative flowcharts.

In alternative embodiments, the techniques described above with respect to pumps and other elements used in $CO_2$-based chromatography systems may be applicable to pumps and other elements used in other types of chromatography systems that include mobile phases that vary greatly in density with minor changes in temperature. For example, a mobile phase including methanol at extremely high pressures may in some instances benefit from the flow splitting techniques described herein. In describing certain examples, specific terminology is used for the sake of clarity. For purposes of description, each specific term is intended to at least include all technical and functional equivalents that operate in a similar manner to accomplish a similar purpose. Additionally, in some instances where a particular example embodiment includes a plurality of system elements, device components or method steps, those elements, components or steps may be replaced with a single element, component or step. Likewise, a single element, component or step may be replaced with a plurality of elements, components or steps that serve the same purpose. Moreover, while example embodiments have been shown and described with references to particular embodiments thereof, those of ordinary skill in the art will understand that various substitutions and alterations in form and detail may be made therein without departing from the scope of the invention. Further still, other aspects, functions and advantages are also within the scope of the disclosure.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be examples and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that inventive embodiments may be practiced otherwise than as specifically described. Inventive embodiments of the present disclosure are directed to each individual feature, system, article, material, kit, and/or method described herein. In addition, any combination of two or more such features, systems, articles, materials, kits, and/or methodologies, if such features, systems, articles, materials, kits, and/or methodologies are not mutually inconsistent, is included within the inventive scope of the present disclosure.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification, unless clearly indicated to the contrary, should be understood to mean "at least one."

The phrase "and/or," as used herein in the specification, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method for controlling fluid flow within a chromatography system, the method comprising:
    activating a makeup pump configured to pump a makeup fluid into the chromatography system downstream of a column;
    determining a flow rate through a first restrictor, wherein the first restrictor is located upstream of a detector and downstream of both the makeup pump and the column;
    decreasing an output volume of the makeup pump in order to direct a portion of an output from the column through the first restrictor and to the detector; and
    increasing an output volume of the makeup pump in order to direct the output from the column to a second restrictor located downstream of the makeup pump and the column and in parallel with the first restrictor and the detector.

2. The method of claim 1, wherein the chromatography system is a $CO_2$-based chromatography system including a $CO_2$-based mobile phase.

3. The method of claim 1, wherein the first restrictor is a fixed restrictor and the second restrictor is a back pressure regulator.

4. The method of claim 3, wherein a maximum flow value of the fixed restrictor determines a maximum amount of fluid directed to the detector.

5. The method of claim 1, wherein the detector is a mass spectrometer or a flame ionization detector.

6. The method of claim 1, wherein the makeup pump is configured to pump a makeup fluid having a same composition as a mobile phase solvent exiting the column.

7. The method of claim 1, wherein increasing an output volume of the makeup pump also flushes the first restrictor of the output from the column.

8. The method of claim 1, further comprising:
    controlling the output volume of the makeup pump in order to selectively direct the output from the column to the detector at predetermined portions of a chromatographic run.

9. The method of claim 1, wherein determining the flow rate through the first restrictor includes measuring the flow rate using a flow sensor.

10. The method of claim 1, further comprising:
    controlling a ratio of the output from the column directed to the first restrictor and the second restrictor by adjusting the output volume of the makeup pump.

11. A system for controlling fluid flow within a chromatography system, the system comprising:
    a makeup pump configured to pump a makeup fluid into a chromatography system downstream of a column;

a first restrictor located downstream of the makeup pump and upstream of a detector;

a second restrictor located downstream of the makeup pump and the column and in parallel with the first restrictor and the detector; and a computing device configured to determine a flow rate through the first restrictor and control an operation of the makeup pump in order to:

> decrease an output volume of the makeup pump in order to direct a portion of an output from the column through the first restrictor and to the detector; and
>
> increase an output volume of the makeup pump in order to direct the output from the column to the second restrictor.

12. The system of claim 11, wherein the chromatography system is a $CO_2$-based chromatography system including a $CO_2$-based mobile phase.

13. The system of claim 11, wherein the first restrictor is a fixed restrictor and the second restrictor is a back pressure regulator.

14. The system of claim 13, wherein a maximum flow value of the fixed restrictor determines a maximum amount of fluid directed to the detector.

15. The system of claim 11, wherein the detector is a mass spectrometer or a flame ionization detector.

16. The system of claim 11, wherein the makeup pump is configured to pump a makeup fluid having a same composition as a mobile phase solvent exiting the column.

17. The system of claim 11, wherein increasing an output volume of the makeup pump also flushes the first restrictor of the output from the column.

18. The system of claim 11, wherein the computing device is further configured to control the output volume of the makeup pump in order to selectively direct the output from the column to the detector at predetermined portions of a chromatographic run.

19. The system of claim 11, wherein the computing device is further configured to determine the flow rate through the restrictor using a flow sensor.

20. A method for controlling fluid flow within a chromatography system, the method comprising:

activating a makeup pump configured to pump a makeup fluid including $CO_2$ into a $CO_2$-based chromatography system downstream of a column;

measuring a flow rate through a first restrictor, wherein the first restrictor is located upstream of a detector and downstream of both the makeup pump and the column;

increasing an output volume of the makeup pump in order to direct an output from the column to a second restrictor located downstream of the makeup pump and the column and in parallel with the first restrictor and the detector;

decreasing an output volume of the makeup pump during a predetermined segment of a chromatographic run in order to direct a portion of the output from the column through the first restrictor and to the detector; and increasing the output volume of the makeup pump after the predetermined segment of the chromatographic run in order to redirect the output from the column away from the detector and to the second restrictor.

* * * * *